Patented May 7, 1929.

1,711,890

UNITED STATES PATENT OFFICE.

WINFRID HENTRICH, OF WIESDORF-ON-THE-RHINE, AND RUDOLF KNOCHE, OF LEVERKUSEN-ON-THE-RHINE, AND MAX HARDTMANN, OF WIESDORF-ON-THE-RHINE, GERMANY, ASSIGNORS TO GRASSELLI DYESTUFF CORPORATION, OF NEW YORK, N. Y., A CORPORATION OF DELAWARE.

PROCESS FOR THE DYEING OF ARTIFICIAL SILK.

No Drawing. Application filed September 10, 1927, Serial No. 218,852, and in Germany September 22, 1926.

The present invention concerns a process for the dyeing of artificial silk from acyl celluloses, cellulose ethers and conversion products thereof by means of azo dyestuffs derived from the diazo compounds of aryl aminomonosulfonic acids, aryl amino-monocarboxylic acids and substitution products thereof by coupling with α, γ-diketo-hydrindene and derivatives thereof.

In accordance with the invention the azo dyestuffs are obtained by coupling the diazo compounds of aryl amino-monosulfonic acids, or aryl amino-mono-carboxylic acids and substitution products thereof with α, γ-diketohydrindene and derivatives thereof; the resulting azo dyestuffs possess affinity for cellulose acetate silk or silk produced from cellulose ethers. When employing the said dyestuffs very pure and fast dyeing are produced. The dyestuffs are especially valuable for the reason that when mixed with other dyestuffs in the dyeing of the said artificial silks they do not exhibit phototropic properties.

Our invention is illustrated by the following example, which can be varied to suit individual requirements or conditions of working:—

30 grams of the ammonium salt of the dyestuff aniline-4-sulfonic acid-azo-α, γ-diketohydrindene are dissolved in a litre of hot water. Dyeing is carried out for about ¾ hour with a concentration of the dye bath of 1:30 to 1:40 with or without the addition of salts, weak acids or weak alkalies at about 70°. The beautiful pure yellow shades exhibit excellent fastness properties on cellulose acetate silk.

Furthermore, other diazocompounds can be used e. g. those of the 4-chloraniline-2-sulfonic acid, m-xylidine-ortho-sulfonic acid, ortho-sulphanilic acid, 4-aminoacet-anilid-3-sulfonic acid, 5-nitro-2-anisidine-3-sulfonic acid. The coloring matters containing these components dye the acetate silk from yellow to orange shades.

We claim:

1. The process of dyeing organic cellulose esters or ethers which comprises applying to said products azo dyes obtainable from aromatic diazocompounds containing an acid group and an α, γ-diketohydrindene compound.

2. The process of dyeing organic cellulose esters or ethers which comprises applying to said products dyestuffs of the general formula:

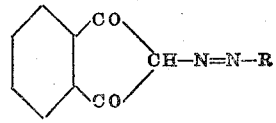

wherein R represents an aryl radicle of an aromatic amine containing an acid group.

3. The process of dyeing organic cellulose esters or ethers which comprises applying to said products dyestuffs of the general formula:

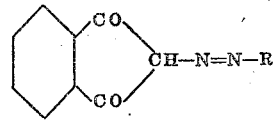

wherein R represents an aryl radicle of an aromatic amine containing a substituent of the group comprising a carboxylic acid and a sulfonic acid group.

4. The process of dyeing orangic cellulose esters or ethers yellow shades which comprises applying to said products a dyestuff of the formula:

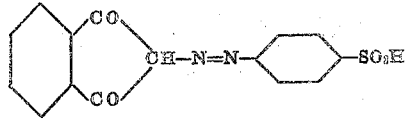

5. As an article of manufacture, organic cellulose ester or ether material dyed with the dyestuff having the general formula:

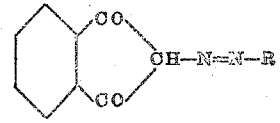

wherein R represents an aryl radicle of an aromatic amine containing an acid group.

6. As an article of manufacture, organic cellulose ester or ether material dyed with the dyestuff having the general formula:

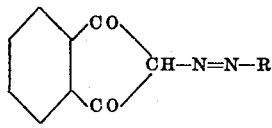

wherein R represents an aryl radicle of an aromatic amine containing a substituent of the group comprising a carboxylic acid and a sulfonic acid group.

7. As an article of manufacture, organic cellulose ester or ether material dyed with the dyestuff having the formula:

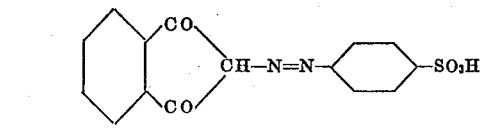

In testimony whereof we have hereunto set our hands.

WINFRID HENTRICH.
RUDOLF KNOCHE.
MAX HARDTMANN.